Aug. 23, 1927.
F. W. FRENCH
DEMOUNTABLE RIM
Filed Oct. 2, 1923
1,639,991
2 Sheets-Sheet 1
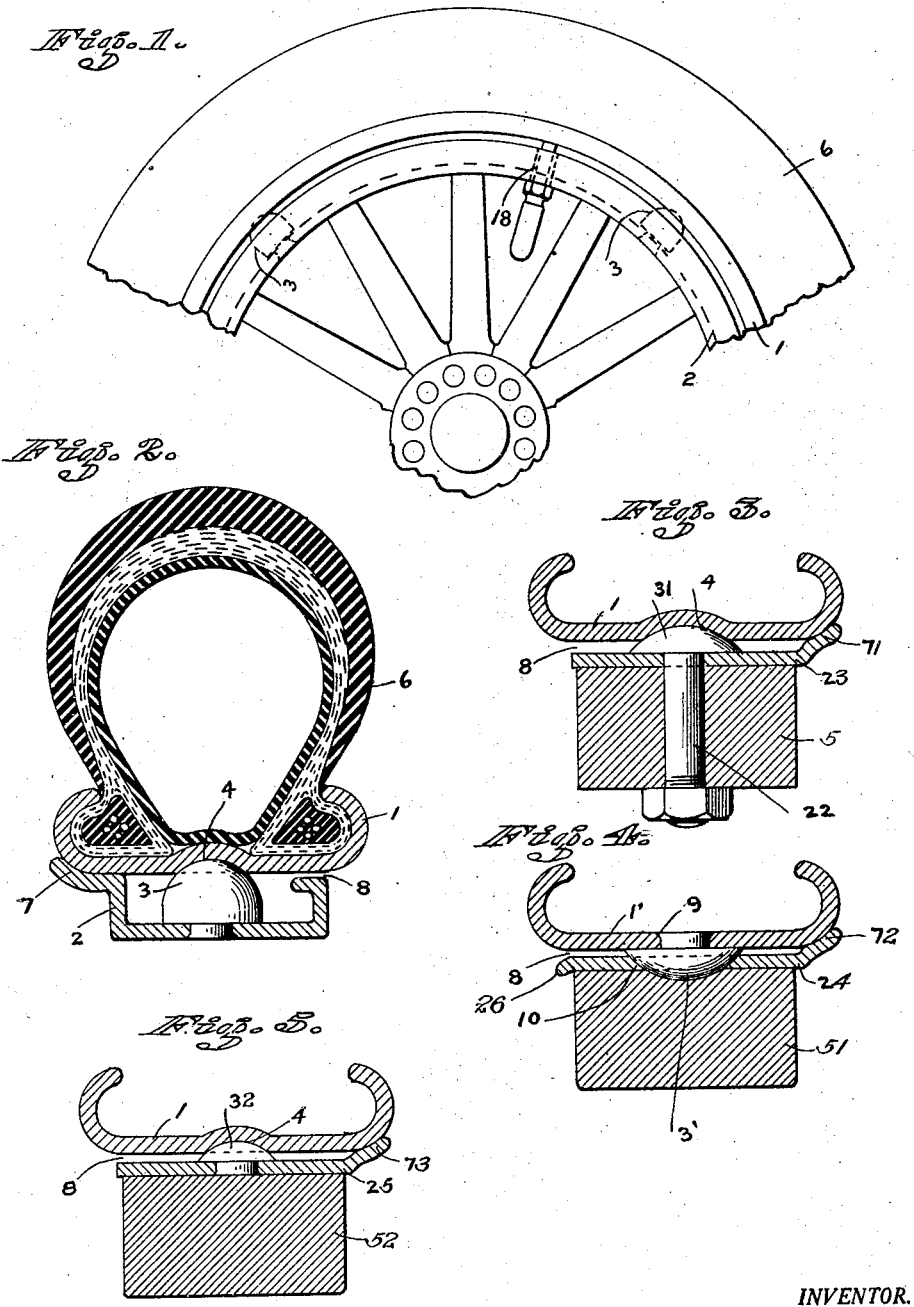
INVENTOR.
FREDERICK W. FRENCH
BY
ATTORNEYS.

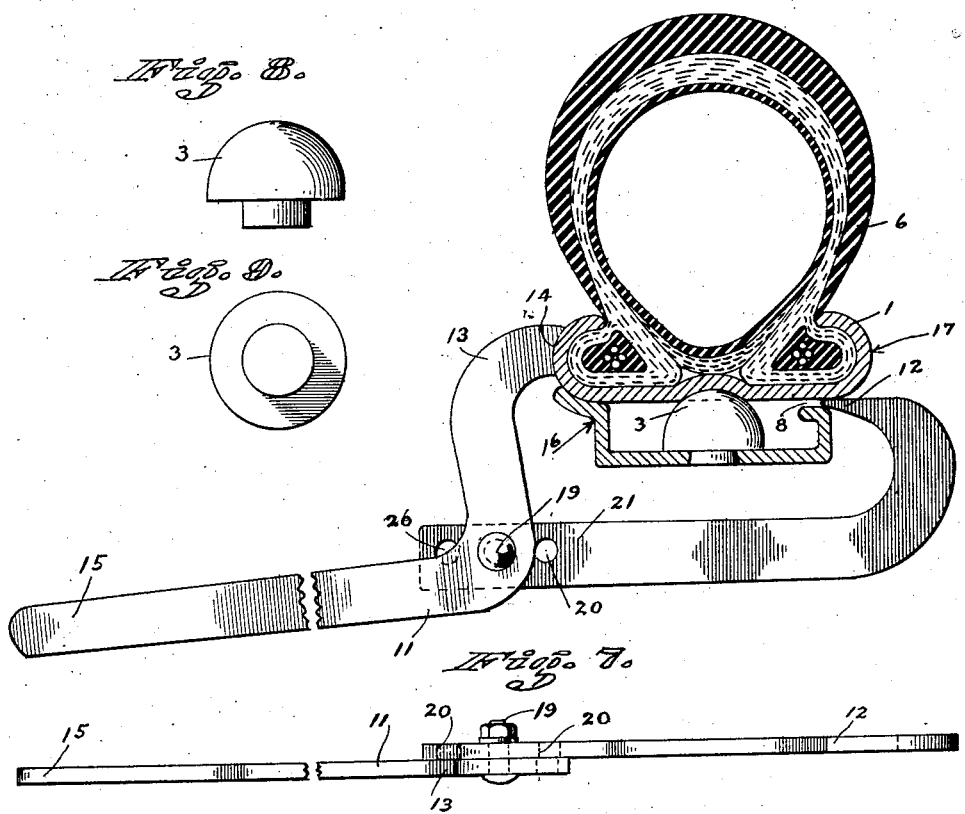

Patented Aug. 23, 1927.

1,639,991

UNITED STATES PATENT OFFICE.

FREDERICK WILLIAM FRENCH, OF OAKLAND, CALIFORNIA.

DEMOUNTABLE RIM.

Application filed October 2, 1923. Serial No. 666,177.

My invention relates to demountable rims as principally used on automobiles in the positioning or replacing of rubber tires on the wheels, and the objects of my improvements are to overcome the present difficulty of changing or removing such rims and tires by means of a simple, cheap and quickly operated device and to provide a rim which will be safe against accidental loosening and absolutely concentric to the wheel axis at all times without the necessity of the even adjusting of a number of separate rim bolts as at present in general use.

My invention is realized in the structure shown in the accompanying drawings, in which Figure 1 shows a portion of an automobile wheel and tire with my rim in place.

Figure 2 is an enlarged cross section of the tire and rim showing its application to a wheel with a steel felloe.

Figures 3, 4, and 5 show in similar cross section slight modifications of the locking elements of my rim as applied to a wooden felloe.

Figure 6 is a section as shown in Figure 2 but illustrates the application of my special demounting or mounting tool.

Figure 7 is a plan view of the tool shown in Figure 6 and Figures 8 and 9 are approximately full size views of one of my locking knobs.

In Figures 1, 2 and 6 my invention is shown as primarily consisting of a demountable rim 1 seated on a fixed rim 2 and locked thereon by a series of knobs 3 secured to the rim 2 and engaging depressions 4 on the inner side of the demountable rim.

The knobs may either be riveted to the fixed rim 2, as shown in Figure 2, or bolted, as shown in Figure 3, the knobs in the latter case simply being the rounded heads 31 of bolts 22 passing through the felloe 5.

In the construction disclosed in Figures 2 and 6, the fixed rim is entirely of steel, as many wheels are now made, and is shown to have at one edge a curved flange 7 for seating thereupon the demountable rim 1, but in Figures 3, 4 and 5 the respective felloes 5, 51 and 52 are of wood, each felloe having thereupon a respective supplementary rim 23, 24 or 25, and each rim being provided with a respective flange 71, 72, or 73 around it outer edge, and this rim, of course, may or may not be continuous.

The rim 1, which supports the rubber tire 6, is shown in Figures 2 and 6 as a clincher tire rim, but it is obvious that a straight-sided rim or a rim of any other type may be employed with my invention.

The other edge of the fixed rim 2 is preferably an easy fit for the rim 1 or slightly spaced therefrom inwardly as indicated at 8, which will be supported along one edge by having its depressions 4 in engagement with the respective knobs 3, 31 or 32, the knobs being spaced at intervals around the wheel, with the depressions correspondingly spaced on the rim.

The knobs 3, 3', 31 and 32 in the different figures are shown to be round, but, of course, they may be oval or of any other shape so long as the depressions are made to match, and the depressions may be simple indentations or holes extending through the rim.

In Figure 4 an inversion of the locking knobs is shown wherein the knob 3' is riveted or otherwise secured at 9 to the rim 1' and extends inwardly into beveled holes or depressions 10 in the fixed rim 24 and corresponding cavities in the wooden felloe 51.

In either modification the functioning of the elements is the same, the rim members being of such a diameter that a firm locking grip is secured between the knobs and the depressions when the rim is forced in place.

In order to mount or demount the rim from the wheel a special tool, of the general nature shown in Figure 6 at 11, is necessary. The tool is here shown engaged for demounting the rim, with its tire, the wedge point 12 of the tool being inserted into the crack 8 inwardly from the rim, and a swinging jaw 13 engaging the other side of the rim at 14, so that, by an upward motion of the handle 15, the rim will be forced off the knobs 3 while the wedge point 12 assists the curvature of the knobs in springing the rim outward. As shown in Figure 4, the fixed rim may also be provided with a flanged edge 26, which is inclined away from the opening 8 in order to facilitate the insertion of the wedge point thereinto.

In replacing the rim the tool is used in the reverse position of that shown, the wedge engaging the side of the fixed rim at 16 and the jaw the remote side of the demountable rim at 17. By an upward pull on the handle the rim will then be forced over the knobs, it being understood that first the air valve stem 18, shown in Figure 1, is inserted through the felloe in the usual way so as to allow the ring to be forced successively over the knobs.

The tool is adjustable for rims of different sizes. Since these are standard, I prefer a simple adjustment, as indicated in Figures 6 and 7, wherein the pivot bolt 19 of the tool may be passed through any of the holes 20 in the transverse extension 21 of the wedge jaw.

It will thus be seen that my invention provides a simple, effective, self-aligning, quickly operated and demountable rim structure and eliminates the usual rim bolts and overcomes the difficulty of their proper adjustment.

I claim:

A vehicle wheel having a fixed rim and a resilient, demountable, non-split rim encircling the fixed rim, the said fixed rim having an obliquely disposed flange extending outwardly from one side thereof and forming a support for one side of the demountable rim, said rims having medially disposed interlocking structures comprising rounded depressions in the inner face of the demountable rim and rounded projections upon the outer face of the fixed rim, said rounded projections being adapted to engage the depressions when the demountable rim is moved across the fixed rim and sprung radially, and said structures cooperating with the said flange to prevent lateral bodily movement of the demountable rim in either direction.

FREDERICK WILLIAM FRENCH.